Nov. 3, 1925.

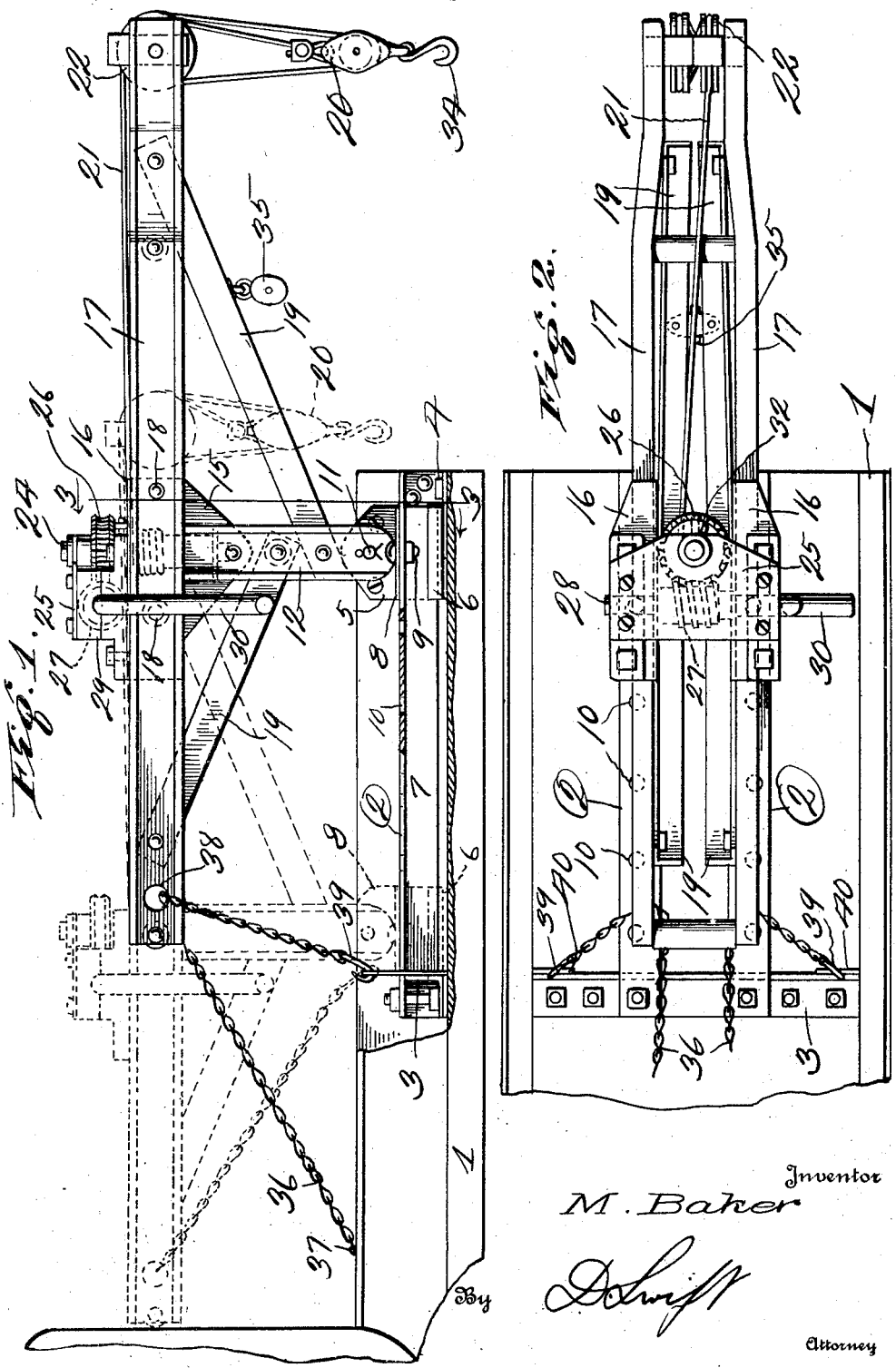

M. BAKER

AUTOMOBILE HOIST

Filed Aug. 6, 1924

Inventor
M. Baker
By D. Swift
Attorney

Patented Nov. 3, 1925.

1,560,071

UNITED STATES PATENT OFFICE.

MYRON BAKER, OF BRIDGEPORT, CONNECTICUT.

AUTOMOBILE HOIST.

Application filed August 6, 1924. Serial No. 730,421.

*To all whom it may concern:*

Be it known that I, MYRON BAKER, a citizen of the United States, residing at Bridgeport, in the county of Fairfield, State of Connecticut, have invented a new and useful Automobile Hoist; and I do hereby declare the following to be a full, clear, and exact description of the invention, such as will enable others skilled in the art to which it appertains to make and use the same.

The invention relates to automobile hoists, and has for its object to provide a device of this character particularly adapted for use on automobile wreck and repair wagons, and one which may be easily and quickly attached to the chassis of the automobile truck.

A further object is to provide a repair truck hoist comprising spaced supporting legs pivotally connected to brackets longitudinally adjustable on bars, the upper ends of which supporting legs are secured to a right angularly disposed beam spaced from the ends of the beam and means cooperating with the inner end of the beam whereby the outer end of the beam may be adjusted at various distances from the ground according to the load that is hoisted, for instance the forward end of an automobile. Also to provide block and fall means extending downwardly from the outer end of the beam for attachment to an automobile to be hoisted.

A further object is to provide a vertically disposed cable drum rotatably mounted on a vertically disposed shaft, which shaft is provided with a worm gear with which a worm meshes, said worm gear being provided with a removable pin which cooperates with a pin carried by the drum during a cable winding operation, and when removed allows freedom of rotation of the drum for unreeling purposes, thereby allowing the block and fall to be easily extended to position for use.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of the hoist showing the same applied to a conventional form of truck.

Figure 2 is a top plan view of the device.

Figure 3:
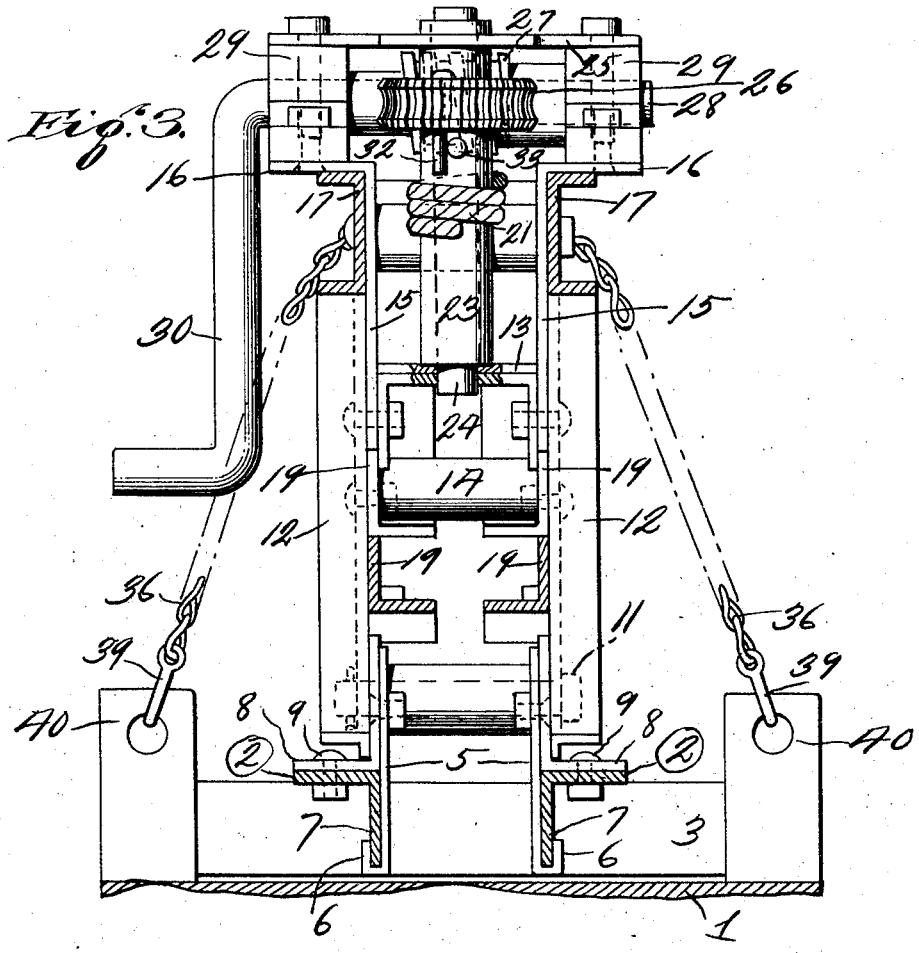
Figure 3 is a vertical transverse sectional view taken on line 3—3 of Figure 1.
Figure 4:
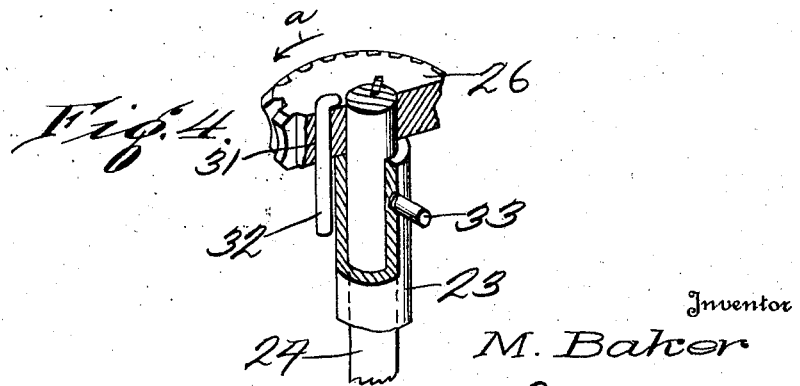
Figure 4 is a detail perspective view of a portion of the rotatable drum and worm gear, part being shown in section to better illustrate the structure.

Referring to the drawing, the numeral 1 designates a chassis of a conventional form of automobile and 2 longitudinally disposed angle bars, the rear ends of which are secured to a transversely disposed bar 3 connected to the chassis and the forward ends of which are secured to the chassis in any suitable manner, however preferably by means of plates 4. Adjustably mounted and longitudinally movable on the angular shaped bars 2 are brackets 5, which brackets are provided with U-shaped members 6, which hook under the vertical portions 7 of the bars 2, and with horizontally disposed flanges 8 which engage the upper sides of the bars 2, and through which flanges and the upper portions of the bars 2, bolts 9 extend for holding the brackets 5 in various longitudinal positions for supporting the device as a whole in various positions in relation to the rear end of the chassis 1. Bolts 9 extend through apertures 10 in the bars 2, therefore it will be seen that the brackets 5 may be easily adjusted to various longitudinal positions. Pivotally mounted on a transversely disposed shaft 11 which extends through the brackets 5 are vertically disposed members 12 in parallel relation to each other, and which members are held in spaced relation to each other by means of the members 13 and 14, interposed between the same. Secured to the inner sides of the upright members 12 are plates 15, which plates extend upwardly and terminate in horizontally disposed flanges 16, which flanges overlie the upper sides of the horizontally disposed beams 17, and which beams 17 are secured to the plates 15 by means of rivets 18, therefore it will be seen that a rigid structure is provided. However, to further brace the beams 17 brace bars 19 are provided, which bars are connected to the inner sides of the beams 17, and incline downwardly and inwardly and are connected to the inner sides of the vertically disposed members 12, therefore it will be seen that a rigid hoisting structure is provided, which is pivotally mounted, and one which may be adjusted inwardly and outwardly for positioning the outer ends of the beams 17 which carry the block and fall 20 in various positions in relation to the rear end of the chassis 1 for facilitating a hoisting operation, for instance for hoisting the forward end of a vehicle for towing purposes, when said forward end of the automobile is damaged. Block and fall has its cable 21 extending upwardly over a sheave 22, and thence rearwardly around a vertically disposed drum 23 rotatably mounted on a vertically disposed shaft 24 between the uprights 12 and which shaft is rotatably mounted in bearings of the bracket 13 and the plate 25 above the beams 17.

Secured to the upper end of the shaft 24 is a worm gear 26, which worm gear rotates with the shaft 23 and is rotated by means of the worm 27 which engages the worm gear 26 and is carried by the transversely disposed shaft 28 rotatably mounted in the bearing blocks 28, mounted on the horizontal portions 16 of the plates 15, and is provided with an operating crank 30 adapted to be grasped by the operator for rotating the same and imparting rotation to the drum 23, and a consequent pull on the cable 21. Extending vertically through an aperture 31 in the worm gear 26 is a removable pin 32, which pin extends downwardly adjacent the outer periphery of the cable drum 23 and into the path of a pin 33 carried by the drum 23, therefore it will be seen when the worm gear 26 is rotated, in the direction of the arrow *a*, the pin 32 will engage the lug 33 and cause the drum 23 to rotate with the shaft 24, thereby winding the cable 21 onto the drum and raising the hook 34 carried by the block and falls 20. It will be noted that by removing the pin 32 from the worm gear 26 the drum 23 will freely rotate on the shaft 24, therefore it will be seen that the cable 21 may be easily unwound from the drum by simply imparting a pull thereon without interference by the worm gear 26 and worm 27, consequently the block and fall may be easily and quickly lengthened for attaching the same to an article to be hoisted, and the pin easily and quickly placed in position again for imparting rotation to the drum 23 for a hoisting operation.

The device adjacent its forward end and preferably on the inclined braces 19 is provided with a single block 35, through which the cable 21 may be passed for leading the same to opposite sides of the device for pulling the automobile out of a ditch or the like. The angular position of the beams 17 may be varied if desired by lowering the rear end thereof and holding the same in various adjusted position by means of the chains 36 which are anchored to the chassis at 37, and extend upwardly through apertures 38 in the rear ends of the beams 17, and extend downwardly and provided with hooks 39, which are hooked into eyes 40 carried by the bar 3.

From the above it will be seen that an emergency automobile hoist or lift is provided which is simple in construction, may be easily and quickly applied to the chassis of an automobile, and one which is positive in its operation and provided with means whereby the cable drum may be released for allowing the rapid unwinding of a cable therefrom without interference from the hoisting mechanism.

The invention having been set forth what is claimed as new and useful is:—

1. A portable hoisting device comprising a horizontally disposed base, said base comprising spaced bars, brackets longitudinally adjustable on said spaced bars and extending upwardly, members carried by said brackets and extending downwardly and hooking under the spaced bars, vertically disposed standards pivotally connected to the upwardly extending brackets, horizontally disposed tiltable frame bars carried by the upwardly extending bars, said upwardly extending bars being rigidly secured to the tiltable frame bars at points spaced from their ends and brace members connecting the upwardly extending bars and the tiltable frame bars.

2. The combination with a tiltable frame of a portable hoist, of a base for supporting said frame, said base comprising spaced parallel bars right angularly shaped in vertical transverse cross section and having one of their flanges horizontally disposed and their other flanges vertically disposed, L-shaped brackets disposed on the spaced bars with one of their arms in engagement with the bars and adapted to receive securing means for securing the brackets to the bars in various positions, plates secured to the inner faces of the brackets and engaging the inner faces of the bars, said plates having their lower end provided with members overlying the undersides of the vertical portions of the bars and means for connecting a tiltable frame to said brackets.

In testimony whereof I have signed my name to this specification.

MYRON BAKER.